(12) United States Patent
Plotkin et al.

(10) Patent No.: US 7,739,605 B2
(45) Date of Patent: Jun. 15, 2010

(54) SYSTEM AND/OR METHOD RELATING TO MANAGING A NETWORK

(75) Inventors: Serge Plotkin, San Carlos, CA (US); Hristo Bojinov, Redwood City, CA (US)

(73) Assignee: NetApp, Inc., Sunnyvale, CA (US)

( * ) Notice: Subject to any disclaimer, the term of this patent is extended or adjusted under 35 U.S.C. 154(b) by 433 days.

(21) Appl. No.: 11/223,443

(22) Filed: Sep. 9, 2005

(65) Prior Publication Data
US 2007/0061432 A1 Mar. 15, 2007

(51) Int. Cl.
G06F 15/177 (2006.01)
G06F 3/00 (2006.01)
G06F 3/048 (2006.01)
G06F 15/173 (2006.01)

(52) U.S. Cl. .................. 715/736; 715/743; 715/853; 709/223

(58) Field of Classification Search .............. 715/853, 715/736, 743; 709/223
See application file for complete search history.

(56) References Cited

U.S. PATENT DOCUMENTS

| | | | |
|---|---|---|---|
| 5,787,086 A * | 7/1998 | McClure et al. ............. 370/413 |
| 6,324,181 B1 * | 11/2001 | Wong et al. .................. 370/403 |
| 6,401,128 B1 * | 6/2002 | Stai et al. ..................... 709/236 |
| 6,456,306 B1 * | 9/2002 | Chin et al. ................... 715/810 |
| 6,538,669 B1 * | 3/2003 | Lagueux et al. ............. 715/764 |
| 6,839,747 B1 * | 1/2005 | Blumenau et al. ........... 709/223 |
| 6,903,755 B1 * | 6/2005 | Pugaczewski et al. ....... 715/735 |
| 6,993,661 B1 | 1/2006 | Garfinkel |
| 7,315,985 B1 * | 1/2008 | Gauvin et al. ............... 715/734 |
| 7,437,676 B1 * | 10/2008 | Magdum et al. ............. 715/738 |
| 2002/0110125 A1 * | 8/2002 | Banks et al. ................. 370/392 |
| 2002/0135610 A1 * | 9/2002 | Ootani et al. ................ 345/734 |
| 2003/0037248 A1 | 2/2003 | Launchbury et al. |
| 2003/0146929 A1 * | 8/2003 | Baldwin et al. ............. 345/733 |
| 2004/0075680 A1 * | 4/2004 | Grace et al. ................. 345/734 |
| 2004/0153642 A1 | 8/2004 | Plotkin et al. |
| 2005/0033988 A1 | 2/2005 | Chandrashekhar et al. |
| 2005/0041812 A1 | 2/2005 | Sundararajan et al. |
| 2005/0080761 A1 | 4/2005 | Sundararajan et al. |
| 2005/0102498 A1 | 5/2005 | Bojinov et al. |
| 2005/0238175 A1 | 10/2005 | Plotkin et al. |

(Continued)

OTHER PUBLICATIONS

Decru, Inc., "Decru Datafort™ Storage Security Appliances", © 2004, 2 pages.

(Continued)

Primary Examiner—Joshua D Campbell
Assistant Examiner—Stephen Alvesteffer
(74) Attorney, Agent, or Firm—Cesari and McKenna, LLP

(57) ABSTRACT

The present invention displays a graphical representation of a multi-layer network having a front end layer and a back end layer. A plurality of front end units of the front end layer and a plurality of back end units of the back end layer are represented as a plurality of front end graphical objects and a plurality of back end graphical objects. A user selects a front end graphical object representing a selected front end unit and a back end graphical object representing a selected back end unit to form a logical connection between the front end unit and the back end unit. The logical connection grants the selected front end unit access to the selected back end unit.

36 Claims, 6 Drawing Sheets

U.S. PATENT DOCUMENTS

2006/0026509 A1* 2/2006 Porter ........................ 715/520

OTHER PUBLICATIONS

Decru, Inc., "Decru Datafort™ E-Series Storage Security Appliances—Transparent Data Security for Network Attached Storage (NAS)", © 2004, 2 pages.

Decru, Inc., "Decru Datafort FC-Series Storage Security Appliances—Comprehensive Security for Storage Area Networks and Tape Backup", © 2004, 2 pages.

U.S. Appl. No. 11/223,444, filed Sep. 9, 2005, Serge Plotkin.
U.S. Appl. No. 11/222,684, filed Sep. 8, 2005, Serge Plotkin.
U.S. Appl. No. 11/223,445, filed Sep. 9, 2005, Serge Plotkin.
U.S. Appl. No. 11/223,890, filed Sep. 9, 2005, Serge Plotkin.

* cited by examiner

SYSTEM AND/OR METHOD RELATING TO MANAGING A NETWORK

BACKGROUND

This disclosure is related to a system and/or method of managing a network, such as a multi-layer network.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

DETAILED DESCRIPTION

Figure 1:
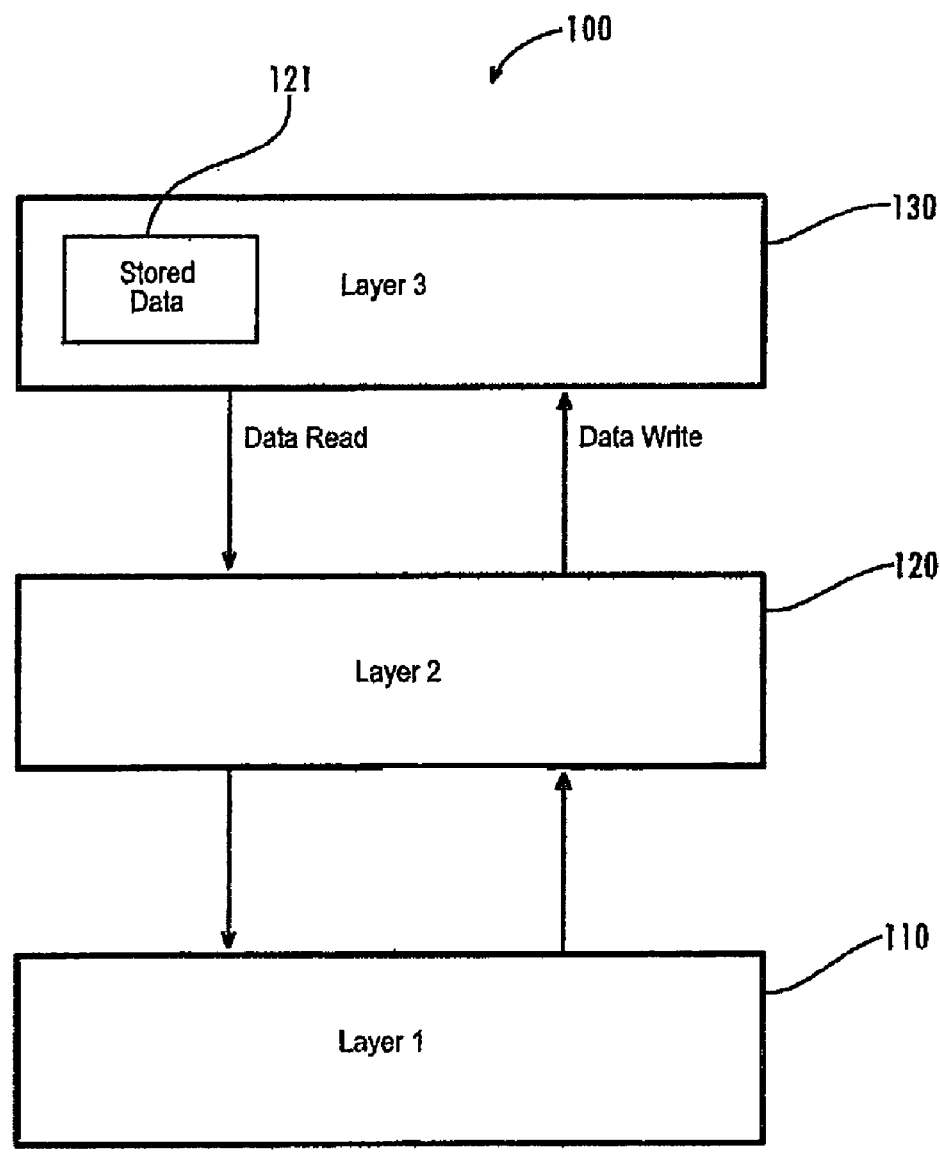
FIG. 1 is a schematic diagram illustrating an embodiment of a multi-layer network architecture.

In the following detailed description, numerous specific details are set forth to provide a thorough understanding of claimed subject matter. However, it will be understood by one of ordinary skill that claimed subject matter may be practiced without these specific details. In other instances, methods, procedures, components and/or circuits that would be understood by one of ordinary skill have not been described in detail so as not to obscure claimed subject matter.

One difficulty with state of the art technology, particularly in networking, for example, includes the possibility that an unauthorized entity and/or individual may gain access to data that may be stored on and/or processed by one or more computing platforms. A need, therefore, exists for techniques and/or systems to may make it more difficult for unauthorized intruders to gain access to such data.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments.

A "graphical user interface" (GUI) as referred to herein may mean one or more user interfaces for interacting with one or more systems, such as a computer system, a computing platform, a semiconductor device, a portable computer, a personal digital assistant, and/or other system, such as an interface comprising one or more graphical representations and/or depictions which a user may interact with by using one or more input devices, for example. In this context, a GUI may comprise a computer program which may be stored in a variety of ways, such as static and/or dynamic random access memory, read-only memory, and/or a hard drive, for example. Additionally, a GUI may be downloadable from a computer network, such as an intranet, extranet, and/or a worldwide computer network, for example. By way of example, a GUI may comprise a web page, such as a hypertext markup language and/or extensible markup language compatible document, which may include one or more executable programs, modules, and/or objects, such as a Macromedia Flash and/or Java compatible program, though, of course, these are merely illustrative example and claimed subject matter is not limited in this regard.

A "graphical representation" and/or a "graphical depiction" as referred to herein may mean one or more elements displayed, such as with one or more display devices in conjunction with one or more of the above-mentioned systems and/or a GUI, for example. In this context, a user of the GUI, such as an administrator, may, at least in part, interact with the graphical representations and/or graphical depictions using one or more input devices, for example.

"Instructions" as referred to herein relate to expressions which represent one or more logical operations. For example, instructions may be "machine-readable" by being interpretable by a machine for executing one or more operations on one or more data objects, such as, for example, a processor. However, this is merely an example of instructions and claimed subject matter is not limited in this respect. In another example, instructions as referred to herein may relate to encoded commands which are executable by a processor or other processing circuit having a command set which includes the encoded commands. Such an instruction may be encoded in the form of a machine language understood by the processor or processing circuit. Again, these are merely examples of an instruction and claimed subject matter is not limited in these respects.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical and/or semiconductor storage media. However, these are merely examples of a storage medium and claimed subject matter is not limited in these respects.

"Logic" as referred to herein relates to structure for performing one or more logical operations. For example, logic may comprise circuitry which provides one or more output signals based at least in part on one or more input signals. Such circuitry may comprise a finite state machine which receives a digital input signal and provides a digital output signal, or circuitry which provides one or more analog output signals in response to one or more analog input signals. Such circuitry may be provided, for example, in an application specific integrated circuit (ASIC) and/or a field programmable gate array (FPGA). Also, logic may comprise machine-readable instructions stored in a storage medium in combination with a processor or other processing circuitry to execute such machine-readable instructions. However, these are merely examples of structures which may provide logic and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "identifying," "initiating," "querying," "obtaining," "hosting," "maintaining," "representing," "modifying," "receiving," "transmitting," "storing," "authenticating," "authorizing," "hosting," "determining" and/or the like refer to the actions and/or processes that may be performed by a computing platform, such as a computer or a similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system or a device that includes the ability to process and/or store data in the form of signals. Thus, a computing platform, in this context, may comprise hardware, software, firmware and/or any combination thereof. Further, unless specifically stated otherwise, a process as described herein, with reference to flow diagrams or otherwise, may also be executed and/or controlled, in whole or in part, by a computing platform.

A "computer program" as referred to herein relates to an organized list of instructions that, if executed, results in or causes a computer, computing device and/or machine to behave in a particular manner. Here, for example, a computer program may comprise machine-readable instructions that are executable to perform one or more desired tasks. In one particular embodiment, although claimed subject matter is not limited in this respect, a computer program may define input data and output data such that execution of the program may provide output data based, at least in part, on the input data. However, these are merely examples of a computer program and claimed subject matter is not limited in these respects.

An "application" as referred to herein relates to a computer program or group of computer programs capable of providing a result and/or action. In a particular embodiment, for example, such an application may comprise a program that performs desired tasks in support of an enterprise, although claimed subject matter is not limited in this respect. For example, an application may comprise one or more end-user programs, such as database programs, spreadsheet programs, and/or word processor program, that are accessible through a network browser, electronic mail, interactive games, video and/or image processing programs, calendars, financial application software, inventory control systems and/or the like. However, these are merely examples of an application and claimed subject matter is not limited in these respects.

A "user" as referred to herein relates to an individual and/or entity comprising an identity and is capable of receiving and/or employing a resource. In one particular embodiment, although claimed subject matter is not limited in this respect, a user may comprise an individual in an organization and/or enterprise that is capable of interacting with applications hosted by information services, enabled with one or more computing platforms for example, provided to individuals in the organization and/or enterprise. In an alternative embodiment, a user may comprise a system, computing platform, application and/or other type of entity capable of interacting with such applications. In another embodiment, a user may comprise an individual and/or entity having administrative rights and/or extra permissions to manage multi-user computing environments. Such users may be referred to as administrators. However, these are merely examples of a user and claimed subject matter is not limited in this respect.

"Stored data" as referred to herein relates to information stored in a storage medium in some retrievable format. In a particular example, a "data storage system" may maintain stored data on one or more storage mediums such as, as identified above, magnetic disk, magnetic tape, and/or semiconductor devices in a format that is retrievable in response to requests and/or commands. In one particular embodiment, a data storage system may define a file structure that identifies one or more portions of stored data by a file name according to a file and/or directory structure. Alternatively, a data storage system may define a data block structure that associates stored data with one or more locations on a storage medium. However, these are merely examples of how a data storage system may maintain stored data in a retrievable format and claimed subject matter is not limited in this respect.

According to an embodiment, a user and/or application may "access" stored data maintained by a data storage system by interacting with the data storage system in some manner. Here, for example, a user and/or application may access stored data by issuing a command and/or request to a data storage system maintaining the stored data. Such an access may include, for example, a retrieval of one or more portions of stored data in response to a read command from a user and/or application. Such access may also include a modification, erasure and/or addition to one or more portions of stored data in response to a write command from a user and/or application. However, these are merely examples of how a user and/or application may access stored data maintained by a data storage system and claimed subject matter is not limited in these respects.

"Authentication" as referred to herein relates to a process of verifying an identity of an individual and/or entity. Such an identity may be authenticated using any one of several methods such as, for example, comparing an individual's physical appearance with a government issued picture identification document, comparing a username and password entered in a computer system to pre-stored information, comparing provided information with unique known identification information, comparing information from a portable electronic device to a known sequence of numbers, and/or comparing a biometric specimen and/or sample with a biometric signature. However, these are merely examples of methods that may be used for authentication and claimed subject matter is not limited in these respects.

While authentication may verify an identity of an individual and/or entity, such authentication may not necessarily, by itself, determine whether a particular individual and/or entity should have access to a resource, according to a security policy, for example. "Authorization" as referred to herein relates to a process of granting and/or denying a user and/or application, for example, access to a resource. In one particular embodiment, although claimed subject matter is not limited in this respect, an authorization process may determine whether a user and/or application is to have access to stored data and/or portion thereof according to a predetermined policy, typically after successful authentication. However, this is merely an example of an authorization process and claimed subject matter is not limited in this respect.

FIG. 1 is a schematic diagram illustrating an embodiment 100 of an example architecture in which an embodiment of a technique to control access to stored data is employed, although claimed subject matter is not limited in scope to this particular architecture or embodiment. In this particular embodiment, FIG. 1 includes a first layer 110, a second layer 120 and a third layer 130. In this particular embodiment, first layer 110 may comprise an initiator layer including one or more initiator units (not shown), such as one or more user accessible computing systems, for example. Thus, for this particular embodiment, first layer 110 may make a request for services, such as that data be written and/or read. In this particular embodiment, second layer 120 may comprise a front end layer including one or more front end units (not shown), such as one or more network locations which may be made accessible to first layer 110, for example. Second layer 120 may receive the request and may then fulfill it, assuming, for example, that it is able to do so. There are a variety of services that may be provided by second layer 120. Frequently such services are data-related, such as authentication, authorization, and/or data storage and/or retrieval, although these are just examples.

In this particular approach, second layer 120 may supplement and/or enhance services that may be available from third layer 130. One service that might be provided by second layer 120 includes security. For example, this may include firewall functionality, such as packet filtering, packet inspection (e.g., stateful and/or stateless), packet format validation, terminating IPSec connections, and/or the like. Another service that might be provided includes data encryption and/or decryption. Without loss of generality, in this context, encryption includes a process in which data is coded so that the content of the data is not capable of being employed and/or understood by a person and/or a device without first being decoded back to the previous form or format it had prior to being encrypted. Thus, decryption, in this context, includes a process of decoding encrypted data back to the form or format it had prior to encryption.

In this particular example, if first layer 110 requests that data be written, second layer 120 may encrypt the data to be written. The data, once encrypted, may be stored by or at a third layer, such as 130. This is illustrated in FIG. 1 by 121. In this particular embodiment, third layer 130 may comprise a back end layer including one or more back end units, such as one or more network locations which may be made accessible to second layer 120, for example. Likewise, second layer 120 may, upon another request for services by first layer 110, such as a read request, retrieve the stored, encrypted data from third layer 130, decrypt it, and provide it to first layer 110. One potential advantage of an embodiment, such as previously described, is that encryption and/or decryption of the data may be made transparent to third layer 130, although it is not necessary that this be the case, even for this embodiment and, thus, claimed subject matter is not limited in scope to embodiments where this is so. Likewise, although claimed subject matter is not limited in scope in this respect, encryption may be also made transparent to first layer 110, e.g., a "consumer" of the services. Likewise, in another embodiment, any two layers, such as first layer 110 and third layer 130, may reside on the same computing platform and even comprise the same layer in some embodiments, although claimed subject matter is not limited in scope in this respect, of course. Also, in other embodiments, any of first layer 110, second layer 120 and/or third layer 130 may reside on multiple computing platforms.

Nonetheless, for such an embodiment, encryption and/or decryption of data stored at or on third layer 130 may not impact operation of layer 130. In this example embodiment, layer 130 may treat data substantially the same regardless of whether or not the data is encrypted. This may provide some benefits, such as making interoperability with other systems possible.

Figure 2:
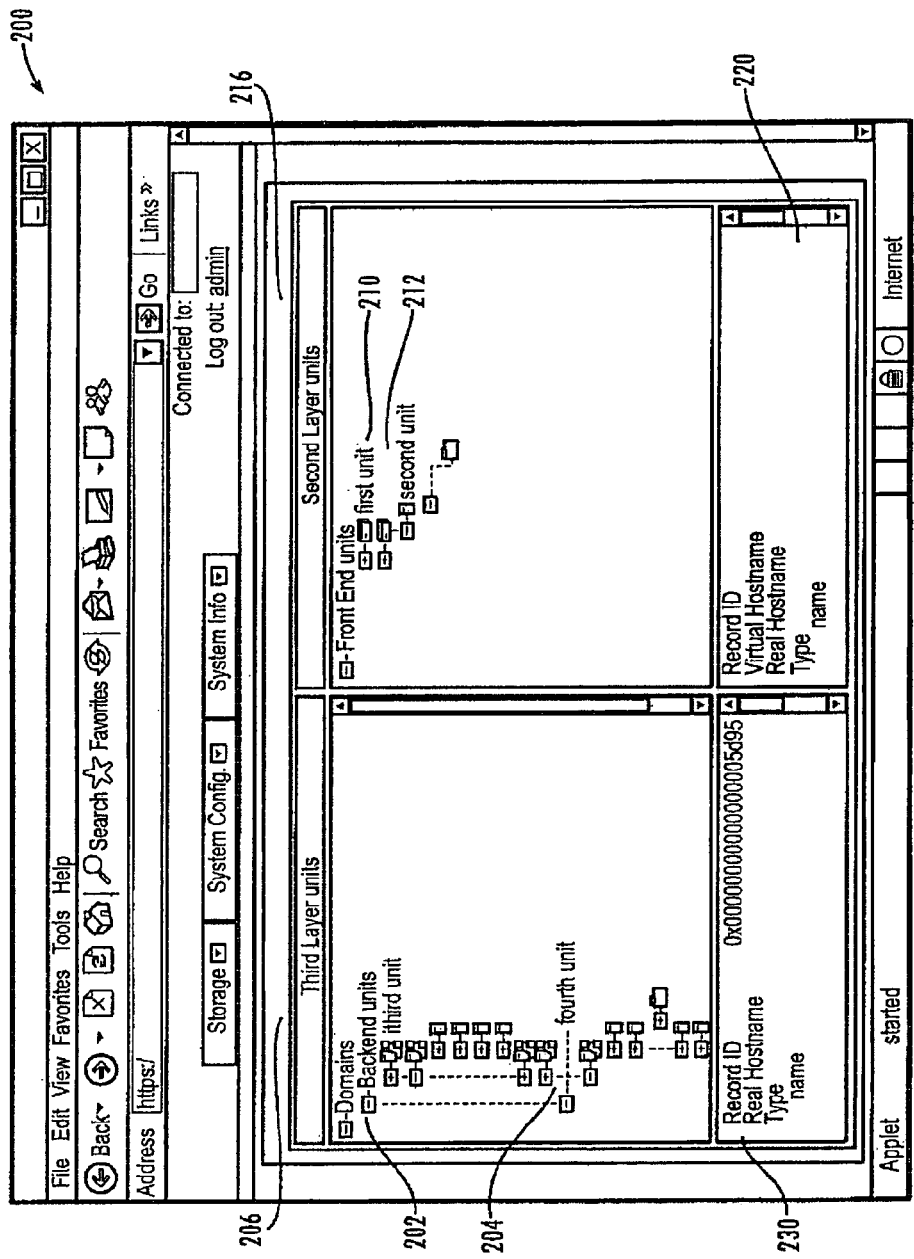
FIG. 2 is a schematic diagram of an embodiment of a graphical user interface (GUI), such as for a multi-layer network.

FIG. 2 is a schematic diagram of an embodiment 200, such as a graphical user interface, such as for a multi-layered network, as described above, for example. Of course, claimed subject matter is not limited in scope to the previously described architecture. For example, a commonly employed multi-layer architecture included within the scope of claimed subject matter is the client-server architecture. However, referring again to this particular embodiment, by way of example, one or more network locations, such as one or more units from first layer 110, second layer 120, and/or third layer 130, for example, may be presented and/or displayed, in one or more portions of GUI 200. In this example, GUI 200 may display graphical representations and/or depictions 202 and/or 204, representing respective third layer units as one or more directory elements in a portion of GUI 200, such as third layer units shown in panel 206, for example. In this particular embodiment, third layer units may correspond to one or more network locations with one or more network addresses. For example, these network addresses may comprise internet protocol addresses and/or uniform resource locators, where data and/or other information, such as one or more programs and/or data files, for example, may, at least in part, be stored. Of course, these are simply examples and claimed subject matter is not limited in scope to only these examples.

In this particular embodiment, a graphical depiction of a third layer unit may correspond to a system, such as one or more computing systems, for example, at least in part connected or coupled to one or more networks, though, of course, claimed subject matter is not limited to this illustrative example. In this particular embodiment, third layer units may be depicted in panel 206, which may comprise a display portion of GUI 200, such as one or more windows and/or one or more portions of a window, for example. Of course, again, this is merely an example and claimed subject matter is not limited in scope to employing such panels for displaying units for a particular layer, for example.

In this particular embodiment, however, GUI 200 may further comprise one or more graphical representations and/or depictions corresponding to one or more second layer units, such as graphical representations 210 and/or 212. For example, graphical representations 210 and/or 212 may be displayed as one or more directory elements in a portion of graphical interface 200, such as a second layer units shown in panel 216, for example. In this particular embodiment, second layer units may be depicted in panel 216, which may comprise a display portion of graphical user interface 200, such as one or more windows and/or one or more portions of a window, for example. Though, again, it should be noted that this is merely an illustrative example relating to a GUI and claimed subject matter is not limited in this regard. In this particular embodiment, however, one or more second layer units may correspond to one or more simulated network locations, such as one or more network addresses and/or uniform resource locators that correspond to simulated and/or virtual network locations, for example. In this context, the terms simulated or virtual network locations is intended to refer to an association of data storage not physically present in a single unit or device. Thus, in this context, the one or more second layer units may comprise one or more network addresses that correspond with one or more computing systems. However, as described below with regard to FIG. 4, such units may, at least in part, simulate one or more network storage locations, though, it should be noted that claimed subject matter is not limited in this regard.

By way of example, an administrator (not shown) may use an input device, such as a mouse, for example, to select one or more of graphical representations 202, 204, 210, and/or 212, such as, for example, by highlighting, one or more of the graphical representations. Of course, claimed subject matter is not limited to a particular technique employed to select graphical representations included as part of a GUI. Any and all techniques now known or to be later developed are intended to be included within the scope of claimed subject matter. In this particular embodiment, however, an administrator may, such as via an input device, as just described, associate one or more selected graphical representations.

Again, claimed subject matter is not limited in scope to a particular selection technique. Thus, in this particular embodiment, inputting one or more commands may comprise, as a few examples, selecting a command from a drop down menu and/or from a menu made visible based at least in part on manipulation of an input device, such as a mouse, to name but a few examples. In addition, an administrator may associate one or more of the graphical representations by dragging a selected graphical representation onto another graphical representation, although other ways of associating selected graphical representations also exist or may be developed. By way of an example, however, an administrator may select graphical representation 202 and drag it onto graphical representation 210 to associate the corresponding third and second layer units, though, of course, claimed subject matter is not limited to this illustrative example.

In this context, associate refers to forming a logical connection between one or more elements, such as, between graphical representations or between units corresponding to graphical representations. For example, referring to the previously described multi-layer architecture, a selected second layer unit may be associated with one or more third layer units. In this particular example, without intending to limit the scope of claimed subject matter, if an administrator associates graphical representation 202 with graphical representation 210, this may have the effect of granting to the second layer unit corresponding to graphical representation 210 access to one or more portions of the third layer unit corresponding to graphical representation 202, though, of course, claimed subject matter is not limited to this simple example.

In addition, GUI 200 may display a host of potentially useful information relating to one or more of the second and/or third layer units, in this example embodiment. In this particular embodiment, for example, GUI 200 may display information relating to one or more second layer units in a portion of the interface, such as second layer unit information panel 220, for example. Additionally, GUI 200 may display information relating to one or more third layer units in another portion of the interface, such as third layer unit information panel 230, for example. In this context, information to be displayed may, without limitation, comprise status information, network associations, applicable protocols, including applicable encryption, data transfer and/or other protocols being executed, to provide only a few possible examples of information that may be made available. In particular, for example, currently active units may be displayed or otherwise identified. Likewise, one of the second layer units may comprise one or more listings of any third layer units that a second layer unit has been associated with or vice-versa. Likewise, encryption schemes or other security protocols employed for communication between particular network locations may be displayed or otherwise indicated. For example, access and/or permissions may be displayed or otherwise depicted. Additionally, the capability of a particular unit to communicate using a desired level of encryption and/or a desired encryption scheme may be indicated or displayed. In this particular embodiment, GUI 200 may be employed to affect or modify the desired level of encryption or some other attribute of a unit. In one particular embodiment, attributes may be modified by making or changing associations between graphical representations of units, for example. Thus, for example, units associated via GUI 200, for example, may result in having an impact on the applicable operations or capabilities of those associated units. As one particular example, associating units depicted graphically may result in those units having the permissions appropriately employed so that information may be shared, such as, for example, across layers. In yet another embodiment, associating graphical representations corresponding to units may have a least or greatest common denominator effect, so that, for example, encryption security may be raised or lowered via such associations. Of course, it should be noted that these are merely illustrative examples relating to a GUI and that claimed subject matter is not limited in this regard. The ability to affect the operation of a network via associations between graphical representations made via a GUI, such as 200, for example, is virtually limitless in terms of potential applications and claimed subject matter is intended to cover such possibilities.

Furthermore, information may be displayed relating particular units, such as, for example, second and/or third layer units in a variety of other ways. For example, GUI 200 may, if one or more of graphical representations 202, 204, 210, and/or 212, is selected, highlight or otherwise graphically identify for a user any other graphical representations associated, in a one of a host of varying ways, with one or more such selected graphical representation. For example, if an administrator selects graphical representation 202, GUI 200 may highlight graphical representation 210 if those graphical representations and/or their corresponding units have been associated, though, of course, claimed subject matter is in no way limited in this regard.

Figure 3:
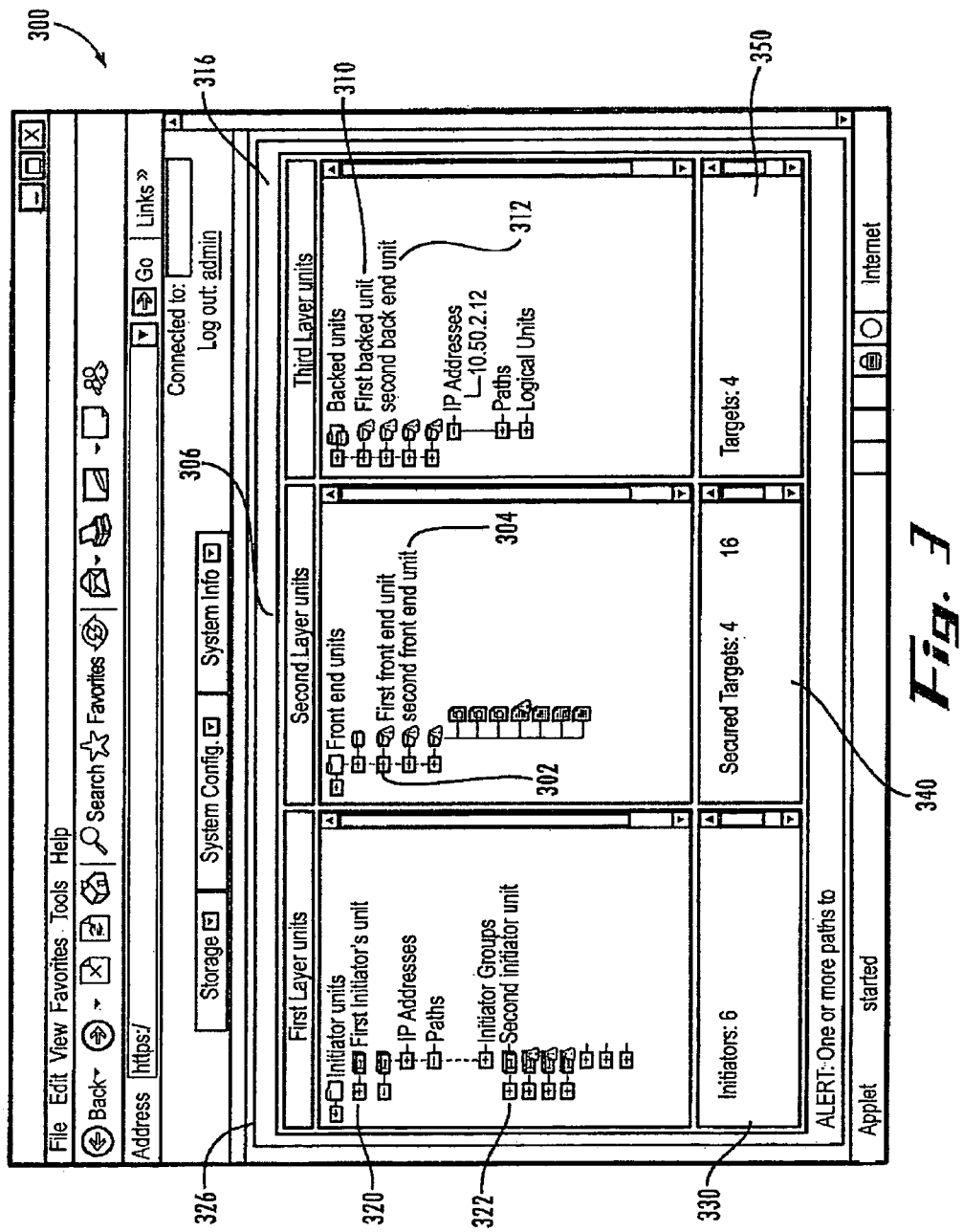
FIG. 3 is a schematic diagram of an alternate embodiment of a GUI, such as for a multi-layer network.

FIG. 3 is a schematic diagram of another embodiment, here 300, of a GUI, such as for a multi-layered network. In this particular embodiment, GUI 300 may comprise one or more representations corresponding to second layer units, such as graphical depictions of second layer units 302 and/or 304, for example. For example, graphical depictions 302 and/or 304 may be displayed in one or more portions of GUI 300, such as second layer units displayed in panel 306. In addition, GUI 300 may further comprise one or more representations of third layer units, such as graphical depictions of third layer units 310 and/or 312, for example. In this example, graphical depictions 310 and/or 312 may be displayed in one or more portions of GUI 300, such as third layer units displayed in panel 316, for example. In this particular embodiment, panel 306 and/or panel 316 may comprise one or more windows and/or one or more portions of a window in GUI 300, though, of course, claimed subject matter is not limited in this regard.

GUI 300 may further comprise one or more representations of one or more first layer units, such as graphical depictions of first layer units 320 and/or 322, for example. Depending at least in part on the particular context and/or application, for example, a first layer unit depicted within GUI 300 may provide various sorts of information about the network and/or users and/or systems included within and/or accessing the network. As simply one example, a first layer unit may correspond to a particular user attempting to access one or more second layer units using one or more computing systems, for example. Alternatively, in a different embodiment, and/or a different application of a similar embodiment, a first layer unit may correspond to an identifiable computing system, such as a computing system located at a particular network address. In still another embodiment and/or application, a first layer unit may correspond to a particular user logged onto a network from one or more computing systems, for example. Of course, in this particular embodiment, access to one or more units, such as second layer units, for example, may, at least in part, be based on the identification of a user and/or a particular computing system, though, of course, claimed subject matter is in no way limited to these illustrative examples. However, in this particular embodiment, graphical depictions 320 and/or 322 may be displayed in one or more portions of GUI 300, such as first layer units shown in panel 326, for example.

As alluded to previously in connection with the discussion of FIG. 2, here, a GUI embodiment may be employed for associating units across layers; however, in this embodiment, this association may cross multiple layers. For example, referring to FIG. 3, front end units, back end units, and/or middle units may therefore be associated. In a multi-tiered network, for example, front end and back end units may comprise units for the bottom and top layers, such as layers 1 and 3, illustrated in FIG. 1, for example. Thus, layer 1, for example, may comprise front end units, whereas layer 3 may comprise back end units. Layer 2, in this example, may comprise middle units; however, there may be more than one layer involved between front end and back end units. For example, a possible architecture, as alluded to previously, may comprise a client-server architecture in which clients comprise front end units and servers comprise back end units. However, in a packet switched network environment, for example, and without intending to the limit the scope of claimed subject matter, a host of middle units may be interposed electronically between a particular client and a particular server. Likewise, as also previously alluded to, in one embodiment, for example, at all potential layers of a possible multi-tiered network, such units may be simulated or virtual in that a particular unit may not correspond to a particular device or piece of hardware and may comprise data associated across various such devices, for example. Thus, one potential embodiment of a GUI in accordance with claimed subject matter, for example, may be capable of associating one or more front end units and one or more back end units, for example, though, of course, claimed subject matter is not limited in this regard. Furthermore, depending at least in part on the particular embodiment, a GUI, such as, for example, embodiment 300 may be employed to associate data and/or services across various physical platforms to construct or create simulated or virtual units.

Figure 4:
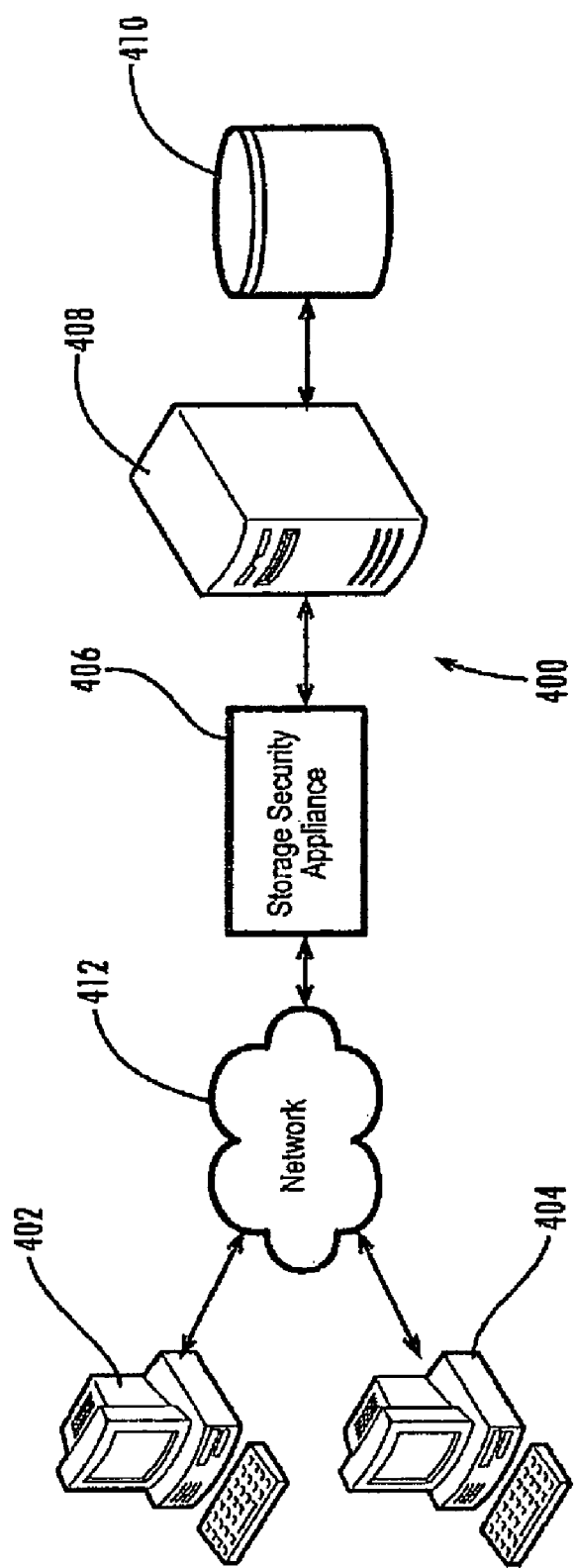
FIG. 4 is a schematic diagram of an embodiment of a network environment.

FIG. 4 is a schematic diagram of an embodiment 400 of a network environment. Network environment 400 may comprise one or more first layer units, such as user accessible computing systems 402 and/or 404, for example. Network environment 400 may further comprise a network security appliance 406, one or more computing systems, such as server 408, and/or one or more data storage systems, such as database 410, for example. In this particular embodiment, one or more second layer units may correspond to one or more network addresses associated with network security appliance 406, for example. In this particular embodiment, server 408 and/or database 410 may correspond to one or more third layer units, for example. Of course, it should again be noted that this is merely an illustrative example of a network environment and that claimed subject matter is in no way limited in this regard. In this particular embodiment, user accessible computing system 402 and/or 404 may communicate with network security appliance 406 via one or more networks, such as network 412. In this particular embodiment, network 412 may comprise an intranet, extranet, a local area network, a wide area network, a virtual private network and/or an internet, for example. As discussed above, user accessible computing systems 402 and/or 404 may be granted access to one or more second layer units. In this particular embodiment, the one or more second layer units may comprise one or more simulated network addresses. For example, network security appliance 406 may simulate one or more network locations corresponding to one or more of the second layer units, such as those described above. In this particular embodiment, one of the second layer units may be associated, such as by using GUI 200 and/or GUI 300, with one or more portions of server 408 and/or database 410, for example. In this particular embodiment, network security appliance 406 may additionally transmit requests from user accessible computing systems 402 and/or 404 to server 408 and/or database 410, based at least in part on the user accessible computing system having been associated with one or more particular second layer units and the one or more particular second layer units having been associated with one or more particular third layer units corresponding to one or more portions of server 408 and/or database 410, for example. It should be noted that this is merely an illustrative example relating to a network environment and that claimed subject matter is not limited in this regard.

Figure 5:
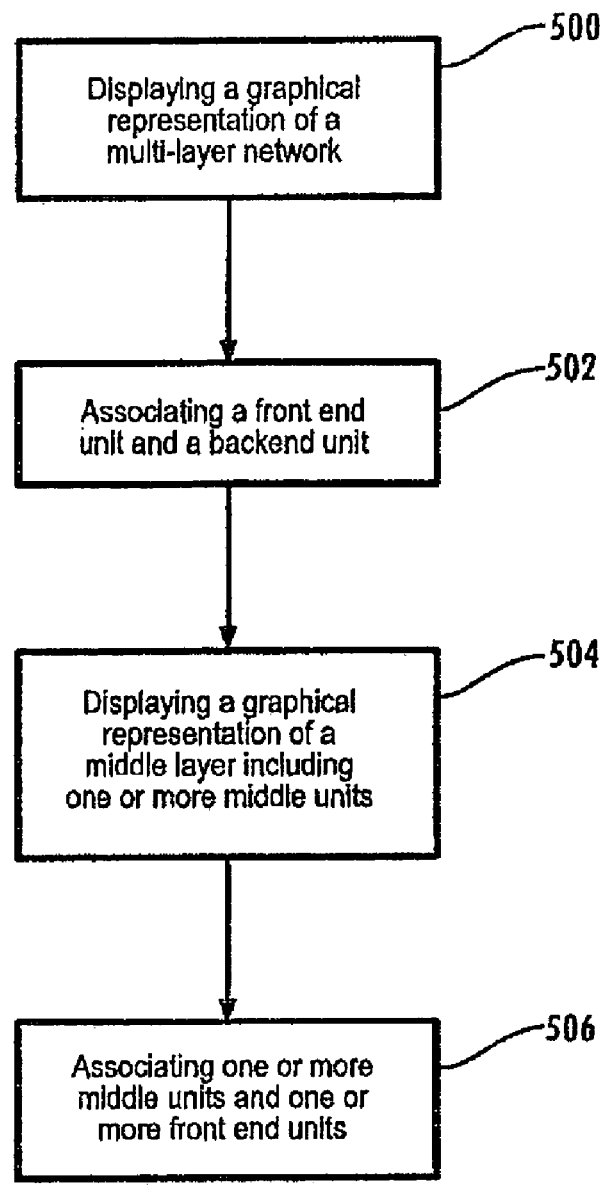
FIG. 5 is a flowchart depicting an embodiment of a method relating to implementation of a GUI, such as for a multi-layer network.

FIG. 5 is a flow chart depicting an embodiment of a method of implementation a GUI. With regard to block 500, this particular embodiment may comprise displaying, such as at least in part with a GUI, a graphical representation of a multi-layer network. In this particular example, a multi-layer network may include at least a front end layer and/or a back end layer, for example a previously described. Thus, in this example, a front end layer may comprise one or more front end units. Likewise, a back end layer may comprise one or more back end units. For example, front end units may correspond to one or more network addresses associated with one or more virtual data storage locations, though, of course, claimed subject matter is not limited in this regard. In addition, back end units may correspond to one or more network addresses associated with one of more physical data storage locations, for example. It should be noted that these are merely illustrative example relating to front end and/or back end units and that claimed subject matter is not limited in this regard. For example, as previously suggested, in some embodiments, different layers may include virtual units. Likewise, in some embodiments, a given layer may comprise a combination of virtual and non-virtual units.

In this particular embodiment, graphical representations corresponding to the one or more front end units and/or the one or more back end units may be displayed. As illustrated by block 502, for example, an association between one or more particular front end units and one or more particular back end units may be made. In this example, associating a particular one of the front end units and a particular one of the back end units may comprise graphically associating a graphical representation corresponding to a particular front end unit and a graphical representation corresponding to a particular back end unit. In this example, associating may be implemented, at least in part, by an administrator graphically associating graphical representations corresponding to the particular front end unit and the particular back end unit with a GUI, as previously described, for example.

With regard to block 504, this particular embodiment may further comprise displaying a graphical representation and/or depiction of a middle layer including one or more middle units. With regard to block 506, one embodiment may further comprise associating one or more middle units with one or more front end units, for example. In this particular embodiment, associating may be implemented, at least in part, by one or more actions of an administrator, such as an administrator graphically associating the graphical representations corresponding to a particular middle unit and a particular front end unit, for example.

Figure 6:
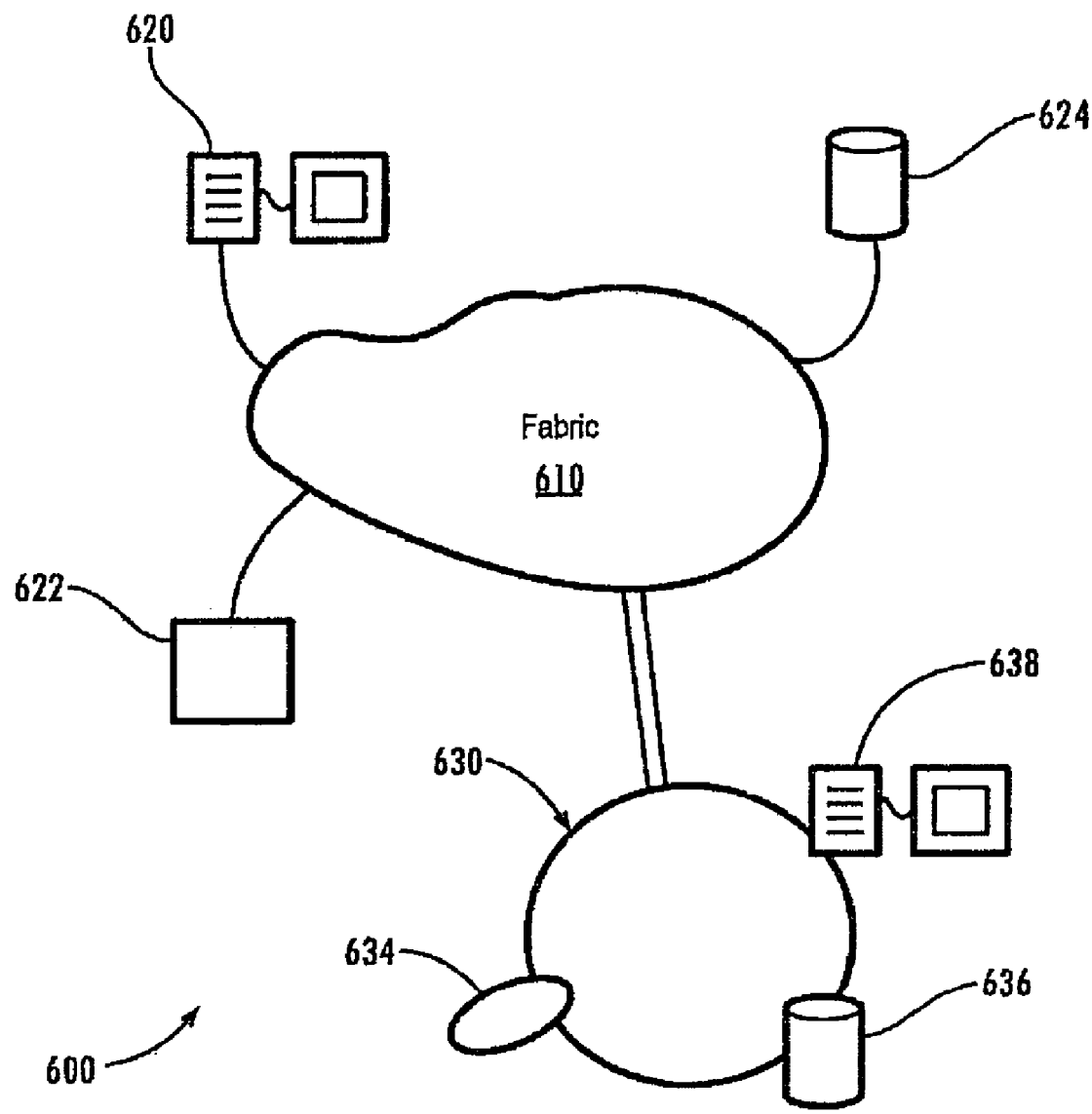
FIG. 6 is a schematic diagram of an example embodiment of a communications network

FIG. 6 is a schematic diagram of an example embodiment of a communications network or system 600 that may employ an embodiment in accordance with claimed subject matter. In this example, embodiment 600 comprises a switched fabric 610 and a plurality of devices, such as 620, 622, 624, and/or groups of devices, such as 634, 636, and 638, as indicated with respect to logical loop 130, for example. References to "a switch" or to "switches" are intended to refer to a generic switch. In this context, then, the term switch refers to a device that includes a processor and memory and that is adapted to or has the capability to route frames or packets between two or more separate devices. In general, a switched fabric, such as fabric 610, may be communicatively coupled to various devices, such as, here, 620, 622, and 624, and may operate as a switching network to allow these devices to communicate with each other. Devices 620, 622, and 624 may comprise any type of device, such as, for example, a computing platform, a storage device, and/or the like, and may be communicatively coupled via fabric 610 by employing point-to-point communications technology or techniques, as one example. In this particular embodiment, fabric 610 comprises a variety of communicatively coupled switches. In this particular embodiment, fabric 610 is also in communication with logical loop 630. Loop 630 here includes devices 634, 636 and 638. In this particular embodiment, loop 630 comprises an arbitrated loop with ring couplings for providing multiple nodes with the ability to arbitrate access to shared bandwidth. It is, of course, appreciated that this particular embodiment is merely an illustrative example and claimed subject matter is not limited in scope in any way to this particular embodiment.

The following discussion details several possible embodiments for accomplishing this, although these are merely examples and are not intended to limit the scope of claimed subject matter. As another example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example. It will, of course, be understood that, although particular embodiments have just been described, claimed subject matter is not limited in scope to a particular embodiment or implementation.

In the preceding description, various aspects of claimed subject matter have been described. For purposes of explanation, systems and configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method for managing a computer network through a graphical representation of a multi-layer network, comprising:
    displaying the graphical representation of the multi-layer network, wherein the graphical representation comprises at least one panel display for each layer of the multi-layer network;
    representing a plurality of front end units of the front end layer as a plurality of front end graphical objects in the graphical representation;
    representing a plurality of back end units of the back end layer as a plurality of back end graphical objects in the graphical representation;
    displaying information through one or more layer unit information panels, wherein the information comprises status information, network associations, applicable protocols including applicable encryption, data transfer and protocols being executed;
    selecting a front end graphical object representing a selected front end unit in the graphical representation and selecting a plurality of back end graphical objects representing a plurality of selected back end units in the graphical representation to form a logical connection between the selected front end unit and the plurality of selected back end units;
    granting, through the graphical representation, the selected front end unit with firewall functionality access to the plurality of selected back end units in response to selecting the front end graphical object and the plurality of back end graphical objects in the graphical representation, wherein at least one back end graphical object of the plurality of back end graphical objects is a simulated network address;
    arbitrating shared bandwidth access between the plurality of front end units and the plurality of back end units through the graphical representation;
    interposing, between the selected front end unit and the plurality of selected back end units in the graphical representation, a plurality of second layer units that are configured to correspond to one or more portions of the plurality of selected back end units; and
    issuing, by the selected front end unit, a data access request directed to the plurality of second layer units, wherein the plurality of second layer units forward the data access request to selected portions of the plurality of selected back end units to perform the data access request upon the selected portions of the plurality of selected back end units.

2. The method of claim 1, further comprising:
    utilizing one or more front end units to store unencrypted data and utilizing one or more back end units to store encrypted data.

3. The method of claim 2, further comprising:
    using storage devices as at least some of the back end units.

4. The method of claim 2, further comprising:
    using logically combined portions of discrete, physically separate storage devices as at least some of the back end units.

5. The method of claim 1, further comprising:
    changing the graphical association between particular front end units and particular back end units to change the multilayer network.

6. The method of claim 1, further comprising:
    associating at least one of the one or more second layer units with at least a one of the plurality of front end units by selecting a graphical representation of a second layer unit and a graphical representation of a front end unit.

7. A method for managing a computer network through a graphical representation of a multi-layer network, comprising:
- displaying the graphical representation of the multi-layer network, wherein the graphical representation comprises at least one panel display for each layer of the multi-layer network;
- representing a plurality of front end units of a first layer as a plurality of front end graphical objects in the graphical representation;
- representing a plurality of back end units of a second layer as a plurality of back end graphical objects in the graphical representation;
- displaying information through one or more layer unit information panels, wherein the information comprises status information, network associations, applicable protocols including applicable encryption, data transfer and protocols being executed;
- arbitrating shared bandwidth access between the plurality of front end units and the plurality of back end units through the graphical representation;
- selecting a front end graphical object representing a selected front end unit in the graphical representation and selecting a plurality of back end graphical objects representing a plurality of selected back end units in the graphical representation to form a logical connection between the selected front end unit and the plurality of selected back end unit;
- granting, through the graphical representation, the selected front end unit with firewall functionality access to the plurality of selected back end units in response to selecting the front end graphical object and the plurality of back end graphical objects in the graphical representation, wherein at least one back end graphical object of the plurality of back end graphical objects is a simulated network address;
- interposing, between the selected front end unit and the plurality of selected back end units in the graphical representation, a plurality of second layer units that are configured to correspond to one or more portions of the plurality of selected back end units, wherein each second layer unit is a network security appliance that is configured to encrypt and decrypt data; and
- issuing, by the selected front end unit, a data access request directed to the plurality of second layer units, wherein the plurality of second layer units forward the data access request to selected portions of the plurality of selected back end units to perform the data access request upon the selected portions of the plurality of selected back end units.

8. The method of claim 7, further comprising:
performing the data access request includes having sufficient authority via network protocols.

9. The method of claim 7, further comprising:
changing the graphical association between the selected front end unit of the front end layer and the plurality of back end units of the back end layer, thereby changing the capability of the front end units to access data on the back end units.

10. The method of claim 7, further comprising:
having the units of at least one of the layers represent users.

11. A system for managing a computer network through a graphical representation of a multi-layer network, comprising:
- a graphical user interface to display the graphical representation of the multi-layer network, the multi-layer network including at least a front end layer and a back end layer, wherein the graphical representation comprises at least one panel display for each layer of the multi-layer network;
- the graphical user interface to represent a plurality of front end units of the front end layer as a plurality of front end graphical objects;
- the graphical user interface to represent a plurality of back end units of the back end layer as a plurality of back end graphical objects;
- one or more layer unit information panels configured to display information, wherein the information comprises status information, network associations, applicable protocols including applicable encryption, data transfer and protocols being executed;
- a process to select a front end graphical object representing a selected front end unit and selecting a plurality of back end graphical objects representing a plurality of selected back end units to form a logical connection between the selected front end unit and the plurality of selected back end units, wherein at least one back end graphical object of the plurality of back end graphical objects is a simulated network address;
- the process to grant the selected front end unit with firewall functionality access to the plurality of selected back end units;
- an arbitrated loop configured to arbitrate shared bandwidth access through the graphical representation between the plurality of front end units and the plurality of back end units;
- the process to interpose, between the selected front end unit and the plurality of selected back end units in the graphical representation, a plurality of second layer units that are configured to correspond to one or more portions of the plurality of selected back end units; and
- the selected front end unit to issue a data access request directed to the plurality of second layer units, the second layer units to forward the data access request to selected portions of the plurality of selected back end units to perform the data access request upon the selected portions of the plurality of selected back end units.

12. A computer readable medium containing executable program instructions executed by a processor, comprising:
- program instructions that display a graphical representation of a multi-layer network, the multi-layer network including at least a front end layer and a back end layer, wherein the graphical representation comprises at least one panel display for each layer of the multi-layer network;
- program instructions that represent a plurality of front end units of the front end layer as a plurality of front end graphical objects in the graphical representation;
- program instructions that represent a plurality of back end units of the back end layer as a plurality of back end graphical objects in the graphical representation;
- program instructions that display information through one or more layer unit information panels, wherein the information comprises status information, network associations, applicable protocols including applicable encryption, data transfer and protocols being executed;
- program instructions that select a front end graphical object representing a selected front end unit in the graphical representation and selecting a plurality of back end graphical objects representing a plurality of selected back end units in the graphical representation to form a logical connection between the selected front end unit and the plurality of selected back end units;

program instructions that grant, through the graphical representation, the selected front end unit with firewall functionality access to the plurality of selected back end units in response to selecting the front end graphical object and the plurality of back end graphical objects in the graphical representation, wherein at least one back end graphical object of the plurality of back end graphical objects is a simulated network address;

program instructions that arbitrate shared bandwidth access between the plurality of front end units and the plurality of back end units through the graphical representation;

program instructions that interpose, between the selected front end unit and the plurality of selected back end units in the graphical representation, a plurality of second layer units that are configured to correspond to one or more portions of the plurality of selected back end units; and program instructions that issue, by the selected front end unit, a data access request directed to the plurality of second layer units, wherein the plurality of second layer units forward the data access request to selected portions of the plurality of selected back end units to perform the data access request upon the selected portions of the plurality of selected back end units.

13. The computer readable media of claim 12, further comprising:

program instructions that display the multi-layer network, so that changing the graphical association of a particular selected front end units and a plurality of particular selected back end units changes the capability of the front end units to access data from the back end units.

14. A method for managing a computer network through a graphical representation of a multi-layer network, comprising:

displaying the graphical representation of the multi-layer network, wherein the graphical representation comprises at least one panel display for each layer of the multi-layer network;

representing a plurality of first layer units of a first layer as a plurality of first layer graphical objects in the graphical representation;

representing a plurality of second layer units of a second layer as a plurality of second layer graphical objects in the graphical representation;

representing a plurality of third layer units of the third layer as a plurality of third layer graphical objects in the graphical representation;

displaying information through one or more layer unit information panels, wherein the information comprises status information, network associations, applicable protocols including applicable encryption, data transfer and protocols being executed;

selecting a first layer graphical object representing a selected first layer unit in the graphical representation and selecting a second layer graphical object representing a selected second layer unit in the graphical representation to form a logical connection between the selected first layer unit in the graphical representation and the selected second layer unit;

selecting a plurality of third layer graphical objects representing a plurality of selected third layer units in the graphical representation to form a logical connection between the selected second layer unit in the graphical representation and the plurality of selected third layer units;

arbitrating, through the graphical representation, shared bandwidth access between the plurality of front end units and the plurality of back end units;

granting, through the graphical representation, the selected first layer unit with firewall functionality access to the selected second layer unit and granting the selected second layer unit access to the plurality of selected third layer units in response to selecting the first layer graphical object, the second layer graphical object, and the plurality of third layer graphical objects in the graphical representation, wherein at least one back end graphical object of the plurality of back end graphical objects is a simulated network address; and issuing, by the selected front end unit through the graphical representation, a data access request directed to the selected second layer unit, wherein the selected second layer unit forwards the request to selected portions of the plurality of selected third layer units to perform the data access request upon the selected portions of the plurality of selected back end units.

15. The method as in claim 14, further comprising:

receiving data at the selected first layer unit, the data received from a client;

processing the data by the selected second layer unit; and storing the output of the second layer unit by the plurality of selected third layer units.

16. The method as in claim 14, further comprising:

encrypting data flowing from the selected first layer unit, the encrypting done by the selected second layer unit; and storing the encrypted data by the plurality of selected third layer units.

17. The method as in claim 14, further comprising:

encrypting data flowing from the selected first layer unit, the encrypting done by the selected second layer unit;

storing the encrypted data by the plurality of selected third layer units;

receiving a request for requested data stored by the plurality of selected third layer units;

decrypting the requested data by the selected second layer unit; and transferring the decrypted data to a client of the selected first layer unit.

18. A system for managing a computer network through a graphical representation of a multi-layer network, comprising:

a graphical user interface to display the graphical representation of the multi-layer network, the multi-layer network including at least a front end layer and a back end layer, wherein the graphical representation comprises at least one panel display for each layer of the multi-layer network;

the graphical user interface to represent a plurality of first layer units of a first layer as a plurality of first layer graphical objects;

the graphical user interface to represent a plurality of second layer units of a second layer as a plurality of second layer graphical objects;

the graphical user interface to represent a plurality of third layer units of the third layer as a plurality of third layer graphical objects;

an arbitrated loop configured to arbitrate shared bandwidth access between the plurality of front end units and the plurality of back end units through the graphical representation;

one or more layer unit information panels configured to display information, wherein the information comprises status information, network associations, applicable protocols including applicable encryption, data transfer and protocols being executed;

a process to select a first layer graphical object representing a selected first layer unit and selecting a second layer graphical object representing a selected second layer unit to form a logical connection between the selected first layer unit and the selected second layer unit, wherein at least one back end graphical object of the plurality of back end graphical objects is a simulated network address;

the process to select a plurality of third layer graphical objects representing a plurality of selected third layer units to form a logical connection between the selected second layer unit and the plurality of selected third layer units;

the selected first layer unit to have firewall functionality access to the selected second layer unit and the selected second layer unit to have access to the plurality of selected third layer units in response to the first layer graphical object, the second layer graphical object, and the plurality of third layer graphical objects being selected; and the selected front end unit to issue a data access request directed to the selected second layer unit, wherein the selected second layer unit forwards the data access request to selected portions of the plurality of selected third layer units to perform the data access request upon the selected portions of the plurality of selected back end units.

19. The system as in claim 18, further comprising:
the selected first layer unit to receive data from a client;
the selected second layer unit to process the data; and
the plurality of selected third layer units to store the output of the selected second layer unit.

20. The system as in claim 18, further comprising:
the selected second layer unit to encrypt data flowing from the selected first layer unit; and
the plurality of selected third layer units to store the encrypted data.

21. The system as in claim 18, further comprising:
the selected second layer unit to encrypt data flowing from the selected first layer unit;
the plurality of selected third layer units to store the encrypted data;
a request received for data stored on the plurality of selected third layer units;
the selected second layer unit to decrypt the requested data; and
the selected first layer unit to transfer the decrypted data to a client.

22. A computer readable medium containing executable program instructions executed by a processor, comprising:
program instructions that display a graphical representation of a multi-layer network, wherein the graphical representation comprises at least one panel display for each layer of the multi-layer network;
program instructions that represent a plurality of first layer units of a first layer as a plurality of first layer graphical objects in the graphical representation;
program instructions that represent a plurality of second layer units of a second layer as a plurality of second layer graphical objects in the graphical representation;
program instructions that represent a plurality of third layer units of the third layer as a plurality of third layer graphical objects in the graphical representation;
program instructions that display information through one or more layer unit information panels, wherein the information comprises status information, network associations, applicable protocols including applicable encryption, data transfer and protocols being executed;
program instructions that select a first layer graphical object representing a selected first layer unit in the graphical representation and select a second layer graphical object representing a selected second layer unit in the graphical representation to form a logical connection between the selected first layer unit in the graphical representation and the selected second layer unit;
program instructions that arbitrate, through the graphical representation, shared bandwidth access between the plurality of front end units and the plurality of back end units;
program instructions that select, through the graphical representation, a plurality of third layer graphical objects representing a plurality of selected third layer units to form a logical connection between the selected second layer unit and the plurality of selected third layer units;
program instructions that grant, through the graphical representation, the selected first layer unit with firewall functionality access to the selected second layer unit and granting the selected second layer unit access to the plurality of selected third layer units in response to selecting the first layer graphical object, the second layer graphical object, and the plurality of third layer graphical objects in the graphical representation, wherein at least one back end graphical object of the plurality of back end graphical objects is a simulated network address; and
program instructions that issue through the graphical representation, by the selected first layer unit, a data access request directed to the selected second layer unit, the selected second layer unit to forward to the data access request to selected portions of the plurality of third layer units to perform the data access request upon the selected portions of the plurality of third layer units.

23. A method for managing a computer network through a graphical representation of a multi-layer network, comprising:
displaying the graphical representation of the multi-layer network, the multi-layer network having a plurality of units, wherein the graphical representation comprises at least one panel display for each layer of the multi-layer network;
representing a plurality of front end units as a plurality of front end graphical objects;
representing a plurality of back end units as a plurality of back end graphical objects;
displaying information through one or more layer unit information panels, wherein the information comprises status information, network associations, applicable protocols including applicable encryption, data transfer and protocols being executed;
selecting a front end graphical object representing a selected front end unit and selecting a plurality of back end graphical objects representing a plurality of selected back end units, to form a logical connection between the selected front end unit and the plurality of selected back end units;

granting, through the graphical representation, the selected front end unit communication access and firewall functionality access to the plurality of selected back end units in response to selecting the front end graphical object and the plurality of back end graphical objects;

arbitrating, through the graphical representation, shared bandwidth access between the plurality of front end units and the plurality of back end units;

interposing, between the selected front end unit and the plurality of selected back end units, a plurality of second layer units that are configured to correspond to one or more portions of the plurality of selected back end units, wherein each second layer unit is a simulated network address; and issuing, by the selected front end unit, a data access request directed to the plurality of second layer units, wherein the plurality of second layer units forward the data access request to selected portions of the plurality of selected back end units to perform the data access request upon the selected portions of the plurality of selected back end units.

24. The method as in claim 23, further comprising:
receiving data at the selected front end unit of a first layer, the data received from a client;
processing the data by a particular second layer unit of the plurality of second layer units of a second layer; and
storing the output of the particular second layer unit by the plurality of selected back end units of a third layer.

25. The method as in claim 23, further comprising:
encrypting data flowing from the selected front end unit of a first layer, the encrypting done by a particular second layer unit of a second layer; and
storing the encrypted data by the plurality of selected back end units of a third layer.

26. The method as in claim 23, further comprising:
encrypting data flowing from the selected front end unit of a first layer, the encrypting done by a particular second layer unit of the plurality of second layer units of a second layer;
storing the encrypted data by the plurality of selected back end units of a third layer;
receiving a request for data stored by the plurality of selected back end units;
decrypting the requested data by the particular second layer unit; and
transferring the decrypted data to a client of the selected front end unit.

27. A system for managing a computer network through a graphical representation of a multi-layer network, comprising:
a graphical user interface to display the graphical representation of the multi-layer network, the multi-layer network having a plurality of units;
the graphical user interface to represent a plurality of front end units as front end graphical objects;
the graphical user interface to represent a plurality of back end units as back end graphical objects;
one or more layer unit information panels configured to display information, wherein the information comprises status information, network associations, applicable protocols including applicable encryption, data transfer and protocols being executed;
a process to select a front end graphical object representing a selected front end unit and the process to select a plurality of back end graphical objects representing a plurality of selected back end units to form a logical connection between the selected front end unit and the plurality of selected back end units;
an arbitrated loop configured to arbitrate, through the graphical representation, shared bandwidth access between the plurality of front end units and the plurality of back end units;
the process to grant, through the graphical representation, the selected front end unit communication access and firewall functionality access to the plurality of selected back end units in response to selecting the front end graphical object and the plurality of back end graphical objects;
the process to interpose, between the selected front end unit and the plurality of selected back end units, a plurality of second layer units that are configured to correspond to one or more portions of the plurality of selected back end units, wherein each second layer unit is a network security appliance that is configured to encrypt and decrypt data; and
the selected front end unit to issue a data access request directed to the plurality of second layer units, the second layer units to forward the data access request to selected portions of the plurality of selected back end units to perform the data access request upon the selected portions of the plurality of selected back end units.

28. The system as in claim 27, further comprising:
the selected front end unit of a first layer unit to receive data;
a particular second layer unit of the plurality of second layer unit to process the data; and
the plurality of selected back end units of a third layer to store the output from the particular second layer unit.

29. The system as in claim 27, further comprising:
a particular second layer unit of a second layer to encrypt data flowing from the selected front end unit of a first layer; and
the plurality of selected back end units of a third layer to store the encrypted data.

30. The system as in claim 27, further comprising:
a particular second layer unit of the plurality of second layer units of a second layer to encrypt data flowing from the selected front end unit of a first layer;
the plurality of selected back end units of a third layer to store the encrypted data;
a request received for data stored on the plurality of selected back end units;
the particular second layer unit to decrypt the requested data; and
the selected front end unit to transfer the decrypted data to a client.

31. A computer readable medium containing executable program instructions executed by a process, comprising:
program instructions that display a graphical representation of a multi-layer network, the multi-layer network having a plurality of units, wherein the graphical representation comprises at least one panel display for each layer of the multi-layer network;
program instructions that represent a plurality of front end units as front end graphical objects;
program instructions that represent a plurality of back end units as back end graphical objects
program instructions that display information through one or more layer unit information panels, wherein the information comprises status information, network associations, applicable protocols including applicable encryption, data transfer and protocols being executed;

program instructions that select a front end graphical object representing a selected front end unit and a plurality of back end graphical objects representing a plurality of selected back end units, to form a logical connection between the selected front end unit and the plurality of selected back end units;

program instructions that arbitrate, through the graphical representation, shared bandwidth access between the plurality of front end units and the plurality of back end units;

program instructions that grant, through the graphical representation, the selected front end unit communication access and firewall functionality access to the plurality of selected back end units in response to selecting the front end graphical object and the plurality of back end graphical objects;

program instructions that interpose, between the selected front end unit and the plurality of selected back end units, a plurality of second layer units that are configured to correspond to one or more portions of the plurality of selected back end units, wherein each second layer end unit is a network security appliance configured to encrypt and decrypt data; and program instructions that issue, by the selected front end unit, a data access request directed to the plurality of second layer units, wherein the plurality of second layer units forward the request to selected portions of the plurality of selected back end units to perform the data access request upon the selected portions of the plurality of selected back end units.

32. A method for managing a computer network through a graphical representation of a multi-layer network, comprising:

displaying the graphical representation of the computer network, wherein the graphical representation comprises at least one panel display for each layer of the multi-layer network;

representing a plurality of front end units in the computer network as a plurality front end graphical objects;

representing a plurality of back end units in the computer network as a plurality of back end graphical objects;

displaying information through one or more layer unit information panels, wherein the information comprises status information, network associations, applicable protocols including applicable encryption, data transfer and protocols being executed;

selecting a front end graphical object representing a selected front end unit and selecting a plurality of back end graphical objects representing a plurality of selected back end units to form a logical connection between the selected front end unit and the plurality of selected back end units;

granting, through the graphical representation, the selected front end unit communication access and firewall functionality access to the plurality of selected back end units in response to selecting the front end graphical object and the plurality of back end graphical objects in the graphical representation, wherein at least one back end graphical object of the plurality of back end graphical objects is a simulated network address;

arbitrating, through the graphical representation, shared bandwidth access between the plurality of front end units and the plurality of back end units;

interposing, between the selected front end unit and the plurality of selected back end units, a plurality of second layer units that are configured to correspond to one or more portions of the plurality of selected back end units, wherein each second layer unit is a fabric switch; and issuing, by the selected front end unit, a data access request directed to the plurality of second layer units, wherein the plurality of second layer units forward the data access request to selected portions of the plurality of selected back end units to perform the data access request upon the selected portions of the plurality of selected back end units.

33. The method as in claim 32, further comprising:

receiving data at the selected front end unit, the data received from a client;

processing the data by a particular second layer unit of the plurality of second layer units; and storing the output from the particular second layer unit by the plurality of back end units.

34. A system for managing a computer network through a graphical representation of a multi-layer network, comprising:

a graphical user interface to display the graphical representation of the computer network, wherein the graphical representation comprises at least one panel display for each layer of the multi-layer network;

the graphical user interface to represent a plurality of front end units in the network as a plurality front end graphical objects;

the graphical user interface to represent a plurality of back end units in the network as a plurality of back end graphical objects;

one or more layer unit information panels configured to display information, wherein the information comprises status information, network associations, applicable protocols including applicable encryption, data transfer and protocols being executed;

a process to select a front end graphical object representing a selected front end unit and a plurality of back end graphical objects representing a plurality of selected back end objects to form a logical connection between the selected front end unit and the plurality of selected back end units;

an arbitrated loop configured arbitrate shared bandwidth access through the graphical representation between the plurality of front end units and the plurality of back end units;

the process to grant, through the graphical representation, the selected front end object communication access and firewall functionality access to the plurality of selected back end units in response to selecting the front end graphical object and the plurality of back end graphical objects;

the process to interpose, between the selected front end unit and the plurality of selected back end units, a plurality of second layer units that are configured to correspond to one or more portions of the plurality of selected back end units, wherein each second layer unit is a simulated network address; and the selected front end unit to issue a data access request directed to the plurality of second layer units, the second layer units to forward the data access request to selected portions of the plurality of selected back end units to perform the data access request upon the selected portions of the plurality of selected back end units.

35. The system as in claim 34, further comprising:

the selected front end unit to receive data;

a particular second layer unit of the plurality of second layer units to process the data; and the plurality of selected back end units to store the output from the particular second layer unit.

36. A computer readable medium containing executable program instructions executed by a process, comprising:

program instructions that display a graphical representation of a computer network, wherein the graphical representation comprises at least one panel display for each layer of a multi-layer network;

program instructions that represent a plurality of front end units in the computer network as front end unit graphical objects;

program instructions that represent a plurality of back end units in the computer network as back end graphical objects;

program instructions that display information through one or more layer unit information panels, wherein the information comprises status information, network associations, applicable protocols including applicable encryption, data transfer and protocols being executed;

program instructions that arbitrate, through the graphical representation, shared bandwidth access between the plurality of front end units and the plurality of back end units;

program instructions that select a front end graphical object representing a selected front end unit and a plurality of back end graphical objects representing a plurality of selected back end units to form a logical connection between the selected front end unit and the plurality of selected back end units;

program instructions that grant, through the graphical representation, the selected front end unit communication access and firewall functionality access to the plurality of selected back end units in response to selecting the front end graphical object and the plurality of back end graphical objects in the graphical representation, wherein at least one back end graphical object of the plurality of back end graphical objects is a simulated network address;

program instructions that interpose, between the selected front end unit and the plurality of selected back end units, a plurality of second layer units that are configured to correspond to one or more portions of the plurality of selected back end units, wherein each second layer unit is a simulated network address; and program instructions that issue, by the selected front end unit, a data access request directed to the plurality of second layer units, wherein the plurality of second layer units forward the data access request to selected portions of the plurality of selected back end units to perform the data access request upon the selected portions of the plurality of selected back end units.

* * * * *